US009752889B2

(12) United States Patent
Ren et al.

(10) Patent No.: US 9,752,889 B2
(45) Date of Patent: Sep. 5, 2017

(54) TIME AND ENVIRONMENT AWARE GRAPHICAL DISPLAYS FOR DRIVER INFORMATION AND DRIVER ASSISTANCE SYSTEMS

(71) Applicant: Robert Bosch GmbH, Stuttgart (DE)

(72) Inventors: Liu Ren, Cupertino, CA (US); Lei Yang, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 14/210,587

(22) Filed: Mar. 14, 2014

(65) Prior Publication Data

US 2014/0277939 A1    Sep. 18, 2014

Related U.S. Application Data

(60) Provisional application No. 61/785,006, filed on Mar. 14, 2013.

(51) Int. Cl.
*G01C 21/00* (2006.01)
*G01C 21/36* (2006.01)

(52) U.S. Cl.
CPC ................ *G01C 21/3638* (2013.01)

(58) Field of Classification Search
CPC ................................. G01C 21/3638
See application file for complete search history.

(56) References Cited

U.S. PATENT DOCUMENTS

| 6,452,544 B1 | 9/2002 | Hakala et al. |
| 6,873,327 B1 * | 3/2005 | Edwards ................. G06T 11/60 345/473 |
| 8,471,732 B2 | 6/2013 | Ren et al. |

(Continued)

FOREIGN PATENT DOCUMENTS

| EP | 2169628 A2 | 3/2010 |
| EP | 2333488 A2 | 6/2011 |
| KR | 10-2013-0024459 A | 3/2013 |

OTHER PUBLICATIONS

International Search Report and Written Opinion corresponding to PCT Application No. PCT/US2014/027229, mailed Aug. 19, 2014 (10 pages).

(Continued)

*Primary Examiner* — Truc M Do
*Assistant Examiner* — Jess Whittington
(74) *Attorney, Agent, or Firm* — Maginot Moore & Beck LLP

(57) ABSTRACT

A graphics display system for driver information and driver assistance applications generates controllable and dynamic graphical effects in conjunction with 3D visualization of maps. The system generates a display of a map in a 3D virtual environment that responds to the environment changes in a dynamic and visually intuitive manner for a vehicle operator. The system processes environment information, including lighting condition, weather condition, and other data acquired from different sensors in the vehicle such as cameras and lighting sensors, or through networked information services. The graphics display can be integrated with different driver information and driver assistance system embodiments including mobile platforms, in-vehicle information systems, web platforms, and PC systems.

12 Claims, 7 Drawing Sheets

(56) References Cited

U.S. PATENT DOCUMENTS

| | | | |
|---|---|---|---|
| 8,498,812 B2 | 7/2013 | Ren et al. | |
| 9,007,234 B2* | 4/2015 | Ozaki | G01C 21/3694 340/905 |
| 2007/0225902 A1* | 9/2007 | Gretton | G01C 21/26 701/533 |
| 2007/0273558 A1 | 11/2007 | Smith et al. | |
| 2008/0249703 A1 | 10/2008 | Matsuno et al. | |
| 2009/0085876 A1* | 4/2009 | Tschirhart | G06T 15/60 345/173 |
| 2009/0254274 A1* | 10/2009 | Kulik | G01S 19/49 701/469 |
| 2009/0273601 A1 | 11/2009 | Kim | |
| 2009/0306883 A1 | 12/2009 | Faenger et al. | |
| 2011/0090221 A1 | 4/2011 | Ren | |
| 2011/0144909 A1 | 6/2011 | Ren et al. | |
| 2013/0235028 A1* | 9/2013 | Giencke | G06T 17/05 345/419 |
| 2013/0271491 A1* | 10/2013 | Anderson | G06T 11/60 345/633 |
| 2013/0293584 A1* | 11/2013 | Anderson | G06T 11/00 345/633 |
| 2014/0002277 A1* | 1/2014 | Fulger | G01C 21/3415 340/905 |

OTHER PUBLICATIONS

3D Navigation with Lane Departure Warning, http://iphone.bosch.com/navigation/en/3dartmap.html, published at least as early as Mar. 14, 2012.

Bosch navigation app features 3d "artMap", http://www.automotiveit.com/bosch-navigation-app-features-3d-%E2%80%9Cartmap%E2%80%9D/news/id-00851, published at least as early as Mar. 14, 2012.

Known issues with the Real-World Weather feature in Flight Simulator, http://support.microsoft.com/kb/841214, published at least as early as Mar. 14, 2012.

Liu Ren's Homepage, https://sites.google.com/site/liurenshomepage/, published at least as early as Mar. 14, 2012.

Supplementary European Search Report corresponding to European Patent Application 14770425 (2 pages).

\* cited by examiner

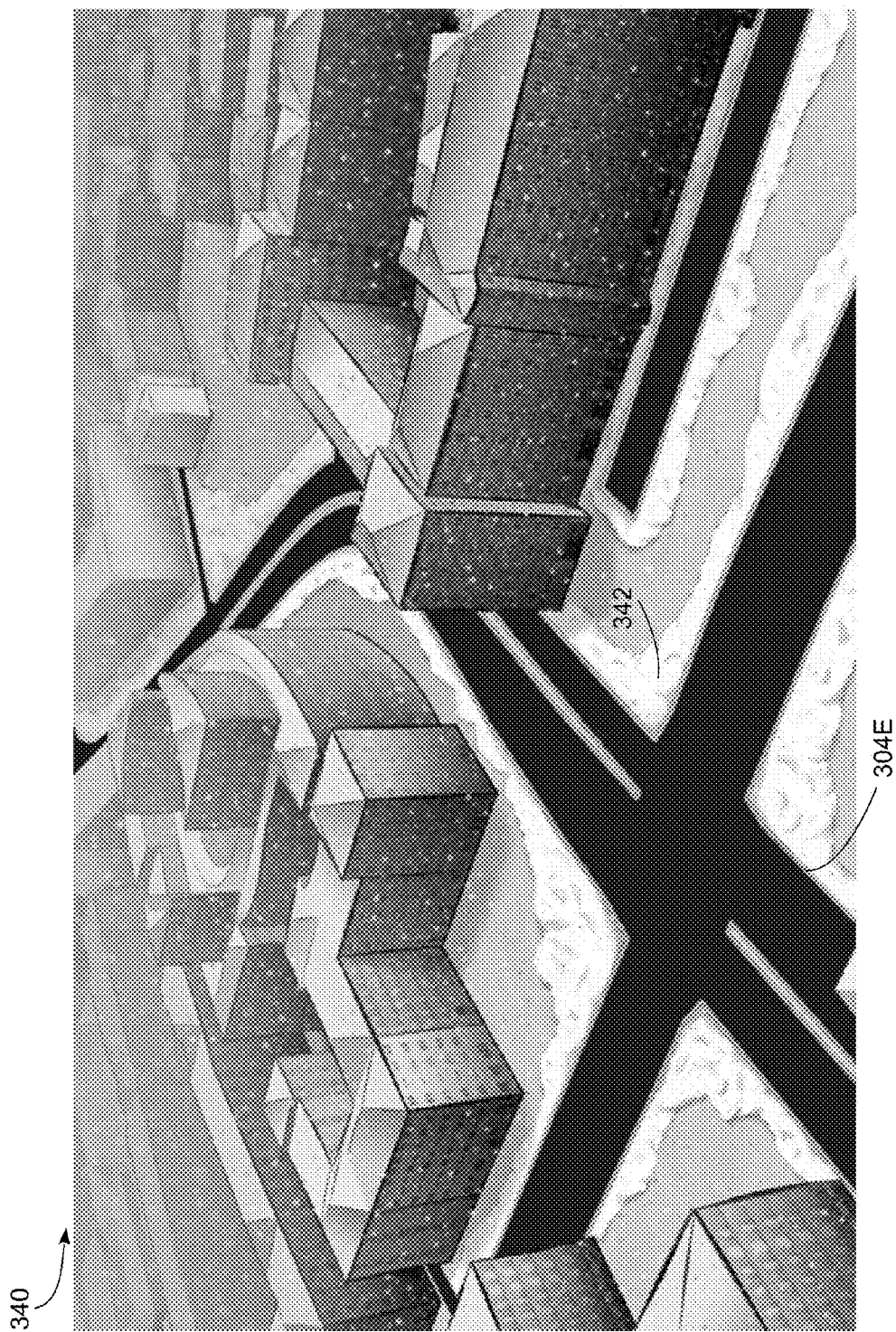

TIME AND ENVIRONMENT AWARE GRAPHICAL DISPLAYS FOR DRIVER INFORMATION AND DRIVER ASSISTANCE SYSTEMS

CLAIM OF PRIORITY

This application claims priority to U.S. Provisional Patent No. 61/785,006, which is entitled "Time and Environment Aware Graphical Displays for Driver Information and Driver Assistance Systems," and was filed on Mar. 14, 2013, the entire contents of which are incorporated by reference herein.

FIELD

This disclosure relates generally to the field of driver information and driver assistance systems (also known as in-vehicle information systems) and, more specifically, to systems and methods that provide graphical displays to a vehicle operator for mapping and navigation applications.

BACKGROUND

Modern motor vehicles often include one or more driver information and driver assistance systems (hereinafter referred to as in-vehicle information systems) that provide a wide variety of information and entertainment options to occupants in the vehicle. Common services that are provided by the in-vehicle information systems include, but are not limited to, vehicle state and diagnostic information, mapping and navigation applications, hands-free telephony, radio and music playback, and traffic condition alerts. In-vehicle information systems often include multiple input and output devices. For example, traditional buttons and control knobs that are used to operate radios and audio systems are commonly used in vehicle information systems. More recent forms of vehicle input include touchscreen input devices that combine input and display into a single screen, as well as voice-activated functions where the in-vehicle information system responds to voice commands. Examples of output systems include mechanical instrument gauges, output display panels, such as liquid crystal display (LCD) panels, and audio output devices that produce synthesized speech.

Three-dimensional (3D) graphics methods have been widely used in different driver assistance and driver information applications. One typical example is navigation systems based on 3D maps. Photorealistic 3D maps employ photorealistic rendering techniques to visualize the real world scenes in a photorealistic way so that the driver could attempt to match the synthetic appearances of rendered 3D objects in the map with those of real-world 3D objects he could observe through the wind shield. This method could help with fast decision making (e.g., turn-by-turn navigations) for the driver in different driving scenarios. Compared with traditional two-dimensional (2D) maps, photorealistic 3D maps are considered to be more helpful for easy driver orientation and fast location recognition. For example, photorealistic 3D mapping and navigation services are provided by multiple online and offline services including services offered by Apple, Google, and Nokia.

However, there are several drawbacks to using photorealistic 3D graphics in mapping and navigation applications. First, many photorealistic details are too distracting for a user during operation of a vehicle. Second, existing photorealistic solutions only provide limited assistance for the vehicle operator to identify an orientation of the vehicle or identify the location of the vehicle because the photorealistic graphics represent a snapshot of the physical environment around the vehicle that does not necessarily depict the environmental conditions around the vehicle while the vehicle is in operation. In other words, current solutions ignore an important fact that the appearances of real-world objects change noticeably due to, for example, changes in lighting and weather conditions.

Another type of 3D maps is referred to as a stylized 3D map, which is based on non-photorealistic rendering techniques. The stylized 3D map employs an automatic simulation of artistic painting processes to emphasize important visual aspects such as general building shape and appearance, or de-emphasize less important details such as wall textures and window details. In other words, map importance could be highlighted in a stylized way. In addition, the stylized 3D maps enable personalized 3D map view solutions by presenting the 3D world using different artistic styles based on the preference of the vehicle operator.

Compared with photorealistic solutions, the stylized 3D maps present the real-world scene to a driver as an illustration that emphasizes certain elements rather than a photograph that has to introduce every detail that might not be necessary for navigation. On one hand, stylized presentations have reduced the visual distraction problem existing "photorealistic" approaches are facing. On the other hand, even with stylized presentation, the general appearance of the rendered 3D world scene does not always correspond to the physical environment. Consequently, improvements to 3D visualization techniques for in-vehicle information systems that provide dynamic and intuitive displays of maps including dynamic environmental and lighting conditions would be beneficial.

SUMMARY

In one embodiment, a time and environmental condition aware graphics system provides controllable and dynamic graphical effects on top of traditional 3D visualization such that when time and environmental condition aware graphics is enabled, different driver assistance and driver information systems (e.g., 3D map-based navigation) could respond to the environment changes in a dynamic and visually intuitive manner and thus become live or environment-aware.

In another embodiment an in-vehicle information system that generates 3D depictions of a virtual environment corresponding to a physical environment that is external to the vehicle has been developed. The system includes a memory, an environment data collection device configured to receive environment data corresponding to the physical environment external to the vehicle, a display device configured to generate a graphical depiction of a plurality of objects in the virtual environment, and a controller operatively connected to the memory, the environment data collection device, and the display device. The memory is configured to store map data corresponding to a plurality of objects in a virtual environment corresponding to a physical environment external to a vehicle, rendering parameter data including a plurality of rendering parameters corresponding to graphical effects to modify a visual representation of the plurality of objects in the map data, and control parameter data including a plurality of control parameters, each control parameter including an association between a predetermined environmental condition in the physical environment external to the vehicle and at least one rendering parameter in the plurality of rendering parameters. The controller is configured to receive the environment data corresponding to the physical environment external to the vehicle, identify a first rendering parameter in the plurality of rendering parameters with reference to the plurality of control parameters and the environment data, and generate a visual depiction of the virtual environment including at least one object in the map data and a graphical effect corresponding to the first rendering parameter being applied to the at least one object in the virtual environment.

In another embodiment, a method for operating an in-vehicle information system to generate 3D depictions of a virtual environment corresponding to a physical environment that is external to the vehicle has been developed. The method includes receiving with a controller environment data corresponding to a physical environment external to the vehicle, identifying with the controller a first rendering parameter in a plurality of rendering parameters stored in a memory with reference to a plurality of control parameters stored in the memory and the environment data, each rendering parameter in the plurality of rendering parameters corresponding to a graphical effect to modify a visual representation of an object in map data stored in the memory, each control parameter including an association between an environmental condition in the physical environment external to the vehicle and at least one rendering parameter in the plurality of rendering parameters, and generating with the controller and a display device a visual depiction of a virtual environment including at least one object in the map data stored in the memory with a graphical effect corresponding to the first rendering parameter being applied to at least one object in the virtual environment with the display device.

BRIEF DESCRIPTION OF THE DRAWINGS

FIG. 3E is another depiction of the 3D virtual environment of FIG. 3A during snowy weather conditions.

DETAILED DESCRIPTION

Figure 1:
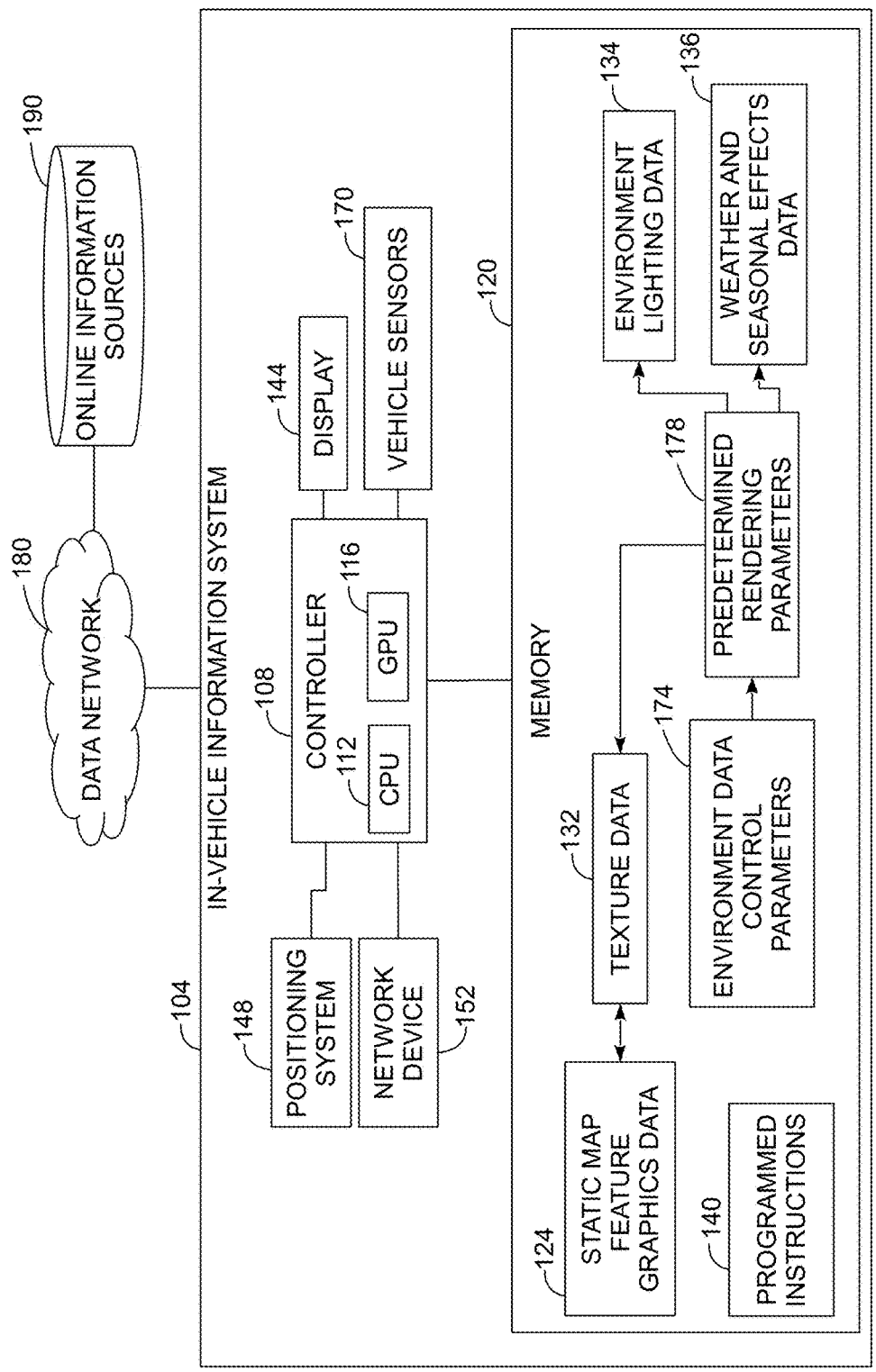
FIG. 1 is a schematic diagram of an in-vehicle information system that is configured to generate a display of a 3D virtual environment with a transformation of the display of the 3D virtual environment based on data corresponding to the environment around the vehicle.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "map feature" refers to any graphic corresponding to a physical location that is displayed on a map. Map features include both natural and artificial structures including, but not limited to, natural terrain features, roads, bridges, tunnels, buildings, and any other artificial or natural structure. Some mapping systems display map features using 2D graphics, 3D graphics, or a combination of 2D and 3D graphics. Some map features are displayed using stylized color graphics, monochrome graphics, or photo-realistic graphics.

As used herein, the term "in-vehicle information system" refers to a computerized system that is associated with a vehicle for the delivery of information to an operator and other occupants of the vehicle. An in-vehicle information system is also referred to as a driver assistance system or driver information system. In motor vehicles, the in-vehicle information system is often physically integrated with the vehicle and is configured to receive data from various sensors and control systems in the vehicle. In particular, some in-vehicle information systems receive data from navigation systems including satellite-based global positioning systems and other positioning systems such as cell-tower positioning systems and inertial navigation systems. Some in-vehicle information system embodiments also include integrated network devices, such as wireless local area network (LAN) and wide-area network (WAN) devices, which enable the in-vehicle information system to send and receive data using data networks. Data may also come from local data storage device. In an alternative embodiment, a mobile electronic device provides some or all of the functionality of an in-vehicle information system. Examples of mobile electronic devices include smartphones, tablets, notebook computers, handheld GPS navigation devices, and any portable electronic computing device that is configured to perform mapping and navigation functions. The mobile electronic device optionally integrates with an existing in-vehicle information system in a vehicle, or acts as an in-vehicle information system in vehicles that lack built-in navigation capabilities including older motor vehicles, motorcycles, aircraft, watercraft, and many other vehicles including, but not limited to, bicycles and other non-motorized vehicles.

As used herein, the term "environment data" includes any data that an in-vehicle information system receives from in-vehicle sensors or external sources in different vehicle embodiments that pertain to environment conditions in the environment that is external to the vehicle. Some environment data pertains to the environment conditions in a region that is proximate to the vehicle, such as data received from the vehicle sensors 170, while other data pertains to a larger region around the vehicle, such as a weather map of a city or state. The term "weather condition" refers to types of environment data that correspond to the weather in a region external to the vehicle. Examples of weather conditions include clear or overcast ambient light conditions, ambient light based on the position of the sun or moon, presence or absence of precipitation, wind direction and speed, the temperature, and the humidity. Other types of environment data pertain to various environment conditions including, but not limited to, traffic information, road construction and road closure information, location information for services and points of interest, public event information, and the like.

FIG. 1 depicts an in-vehicle information system 104 that generates a graphical display of a 3D virtual environment including a representation of ground, such as the surface of the Earth, with ground lighting and wall lighting textures applied to the regions surrounding the structures and to the polygons that depict walls of the structures. The in-vehicle information system 104 includes a controller 108, memory 120, display 144, optional positioning system 148, and optional network device 152. Hardware embodiments of the in-vehicle information system 104 include, but are not limited to, personal computer (PC) hardware, embedded system hardware including embedded computing hardware for use in a motor vehicle, and mobile electronic devices including smartphone and tablet computing devices.

In the in-vehicle information system 104, the controller 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device. In one embodiment, the CPU is a commercially available central processing device that implements an instruction set such as one of the x86, ARM, Power, or MIPS instruction set families. The GPU includes hardware and software for display of both 2D and 3D graphics. In one embodiment, controller 108 executes software drivers and includes hardware functionality in the GPU 116 to generate 3D graphics using the OpenGL, OpenGL ES, or Direct3D graphics application programming interfaces (APIs). For example, the GPU 116 includes one or more hardware execution units that implement, fragment shaders, and vertex shaders for the processing and display of 2D and 3D graphics. During operation, the CPU 112 and GPU 116 execute stored programmed instructions 140 that are retrieved from the memory 120. In one embodiment, the stored programmed instructions 140 include operating system software and one or more software application programs that generate 3D graphics, including mapping and navigation applications.

The controller 108 executes the mapping and navigation program and generates 3D graphical output with graphical transformations that depict map features in an environment around the vehicle with lighting and other graphical effects that depict the appearance of the physical environment around the vehicle in an intuitive manner. The controller 108 is configured with software and hardware functionality by storing programmed instructions in one or memories operatively connected to the controller and by operatively connecting the hardware functionality to the processor and/or other electronic, electromechanical, or mechanical components to provide data from sensors or data sources to enable the processor to implement the processes and system embodiments discussed below.

The memory 120 includes both non-volatile memory and volatile memory. The non-volatile memory includes solid-state memories, such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104. In addition to the programmed instructions 140, the memory 120 includes map data corresponding to a virtual environment 124, texture data 132, environment lighting data 134, weather conditions and seasonal effects data 136, a set of control parameters 174, and a set of predetermined rendering parameters 178.

As used herein, the term "map data" as depicted in the stored map data 124 refers to geographic data and graphics data corresponding to roads, structures, natural terrain features, and any relevant geographic data pertaining to the physical environment around the vehicle that does not change frequently during operation of the in-vehicle information system. For example, buildings and other structures static map data 124 of the virtual environment include a plurality of models for three-dimensional structures that are formed from multiple polygons. The structure data include vertices with three-dimensional coordinates that define a series of interconnected polygons, such as triangles, that form the shape of a structure in the 3D virtual environment. The map data 124 are also referred to as "static map data" because the map feature data remains substantially unchanged under changing lighting and weather conditions. Of course, some embodiments of the in-vehicle information system 104 can receive periodic map data updates to incorporate long term changes to physical world buildings, roads, and other features, but the static map data do not typically change while using the in-vehicle information system 104 during a single trip with the vehicle. The controller 108 is configured to modify the display the virtual environment including the static map data with reference to multiple dynamic factors including the time of day, location of the vehicle, weather conditions around the vehicle, and traffic patterns around the vehicle.

In the memory 120, the texture data 132 include a plurality of textures, which are typically 2D images. The textures data are mapped to the surfaces of the structures in the 3D virtual environment to provide more realistic appearances to the polygon structure models in the virtual environment. In the embodiment of FIG. 1, the texture data 132 are associated with the static map feature data 124. When the controller 108 generates a graphical depiction of the virtual environment including static map features, the GPU 116 retrieves predetermined textures from the texture data 132 and maps the textures to the static map features 124 as part of the graphics rendering process. For example, a polygon model corresponding to a building in the static map feature data 124 is associated with one or more of the textures 132, such as a brick texture for the walls of the building and a texture depicting shingles that are mapped to the roof of the building model The textures 132 are part of the static map display. Textures optionally include lighting and shadow textures as well as textures for generating artistic graphical effects that are applied to the structure models for buildings, roads, and other map features in the 3D virtual environment.

The environment lighting data 134 include illumination sources that correspond to one or more natural and artificial light sources including, but not limited to, the sun, moon, stars, streetlights, building lights, headlights in the vehicle that includes the in-vehicle information system 104, and headlights from other vehicles. In one embodiment, the environment lighting data 134 include almanac information to identify the relative location of the sun, moon, and phase of the moon with reference to the day of year, time of day, and geographic location of the vehicle when the in-vehicle information system 104 generates a visualization of the 3D virtual environment. In another embodiment, the in-vehicle information system 104 retrieves the almanac data from an online information source 190 with the network device 152. During operation, the controller 108 illuminates the map features using natural light sources, artificial light sources, or both to generate a visualization where the lighting conditions in the display correspond to lighting conditions in the physical environment around the vehicle. For example, the controller 108 positions the sun at an appropriate location in the sky during daylight hours to depict map features with illumination and optionally shadows that are similar to the illumination and shadows in the physical environment around the vehicle.

The weather and seasonal effects data 136 include 3D graphics objects, textures, and dynamic shader programs that generate one or more graphical effects and animations to transform the depiction of the static map feature graphics in the 3D virtual environment. For example, weather effects include rain, snow, fog, clouds with varying densities, and rays of light indicating bright sunshine. Some weather effects are shown with animation such, as precipitation, and the animated precipitation optionally depicts the intensity of the precipitation level. In one embodiment, the weather and seasonal effects indicate wind by movement of clouds, snow or rain, swaying of trees and other map features the move in windy conditions, or blowing leaves to indicate wind during sunny conditions. The in-vehicle information system 104 generates weather and seasonal effects with reference to weather report data from the online information sources 190, sensor data from the vehicle sensors 170, and with current time and date information. For example, in one embodiment the weather and seasonal effects data include different color and texture patterns for vegetation to depict the vegetation as brown during winter, green during spring and summer and different with various leaf colors during autumn months. Other sets of textures are applied to different objects, such as buildings and roads, based on the ambient light conditions around the vehicle and weather to depict the same static map objects in the 3D virtual environment differently based on the ambient conditions around the vehicle.

As used herein, the term "control parameter" refers to data encoding rules that associate information pertaining to the environment external to the vehicle with one or more rendering parameters for the application of different graphical effects to objects in the map. The graphical effects provide a visual display of the map that conveys the information about the environment around the vehicle to the operator in an intuitive manner. In the memory 120, the sensor and online control parameter data 174 include a predetermined set of inputs from either the vehicle sensors 170 or the online information sources 190 that correspond to the appearance of the physical environment around the vehicle and the related depiction of the static map features in the 3D virtual environment. Each entry in the control parameters data 174 corresponds to one or more predetermined graphical effects in the rendering parameters data 178. As used herein, the term "rendering parameter" refers to instruction data, such as GPU shader program instructions, or graphical data, such as one or more textures, that the in-vehicle information system applies to static map data to generate the varying graphical outputs for the static map data. The in-vehicle information system 104 uses the control parameters to select different shader programs or rendering parameters for generation of the graphical outputs that inform the vehicle operator of conditions in the environment outside of the vehicle in an intuitive manner. In the embodiment of FIG. 1, the parameters 178 include graphical effects that use the environment lighting data 134, and the weather and seasonal effects data 136 to apply one or more graphical effects to a 3D display of the static map features 124. In the in-vehicle information system 104, the sensor and online data control parameters 174 and the predetermined rendering parameters 178 are stored in the memory 120 prior to use of the in-vehicle information system 104. As described below, in one embodiment a machine learning process generates the associations between the sensor and online data control parameters 174 and the predetermined rendering parameters 178 in an offline manner.

During operation, the controller 108 receives environment data from the sensors 170 and network device 152 from the online information sources 190. The vehicle sensors 170 and network device 152 are examples of environment data collection devices. As used herein, the term "environment data collection device" refers to any device that generates or receives environment data for use by the controller in an in-vehicle information system. The vehicle sensors 170 generate environment data corresponding to the vehicle and the environment around the vehicle, while the network device 152 receives environment data from the online information sources 190 in response to queries from the in-vehicle information system 104. The controller 108 associates different types of environment data with one or more of the control parameters 174. The controller 108 identifies one more of the predetermined rendering parameters 178 that correspond to the identified control parameters to apply graphical transformations to the depiction of the map features in the 3D virtual environment. For example, the controller 108 processes digital photograph data generated from vehicle cameras to identify the ambient light level around the vehicle or a light sensor in the vehicle generates a light level measurement. The controller 108 identifies the control parameter entry 174 for the light level, and the corresponding predetermined rendering parameter 178 that adjusts the level of light to correspond to the sensor data.

In some embodiments, the control parameters 174 can override default graphical transformation effects. For example, during midday with sunny weather, the 3D virtual environment is typically depicted with a bright lighting condition. If the vehicle travels in a shadow between buildings or through a tunnel, however, the sensors 170 detect reduced light conditions in the immediate vicinity of the vehicle. The controller 108 is configured to override the control parameters corresponding to the time of day and weather report data to select a rendering parameter 178 and environment lighting effect 134 that depicts the environment around the vehicle with reduced lighting to depict the physical environment around the immediate vicinity of the vehicle with greater accuracy.

The in-vehicle information system 104 includes an optional network device 152 that is configured to send and receive data from external computing systems, such as the online information sources 190, through a data network 180. Examples of the network device 152 include wired network adapters such as Ethernet and universal serial bus (USB) adapters, and wireless network adapters such as 3G or 4G wireless wide area network (WWAN), 802.11 or Bluetooth wireless local area network (WLAN) adapters. In some embodiments, the controller 108 retrieves static map feature graphics data 124, texture data 132, environment lighting data 134, and weather and seasonal effects data 136 from one or more of the online information sources 190. In some embodiments, the memory 120 caches the static map graphics data 124 and the controller 108 stores additional graphical data that is received through the network device 152 to update the contents of the memory 120.

As depicted in FIG. 1, the online information sources 190 include any online service that provides data in a manner that is accessible by the in-vehicle information system 104 through the data network 180. For example, online information sources 190 include live weather services that provide information related to the weather around vehicle, including cloud, wind, temperature, precipitation, and road hazard conditions. Another online information source 190 is an online traffic service that produces reports regarding traffic volume, accidents, and other traffic information. In some embodiments of the in-vehicle information system 104, the controller 108 also retrieves static map feature graphics data from an online mapping service 190 and stores the data in the static map feature graphics 124 in the memory 120. The in-vehicle information system 104 updates the static map feature graphics 124 as the vehicle moves through different geographic regions.

The in-vehicle information system 104 includes an optional positioning system device 148 that is operatively connected to the controller 108. Examples of positioning systems include global positioning system (GPS) receivers, radio triangulation receivers that identify a location of the in-vehicle information system 104 with respect to fixed wireless transmitters, and inertial navigation systems. During operation, the controller 108 executes mapping and navigation software applications that retrieve location information from the positioning system 148 to identify a geographic location of the in-vehicle information system 104 and to adjust the display of the virtual environment to correspond to the location of the in-vehicle information system 104. In navigation applications, the controller 108 identifies the location and movement of the in-vehicle information system 104 for the generation of routes to selected destinations and display of the routes in the 3D virtual environment.

During operation, the controller 108 receives data corresponding to the environment around the vehicle from multiple sources. In the embodiment of FIG. 1, the sources include the vehicle sensors 170, online information sources 190, and the positioning system 148. The controller 108 uses some environment data indirectly. For example, the positioning system 148 provides data pertaining the location of the vehicle, and the controller 108 uses the position data as part of a query to an online information source 190 to, for example, identify weather and traffic in the region around the vehicle or in another region along the route of the vehicle where the vehicle will be traveling in the future.

In the in-vehicle information system 104, the display 144 is either an integrated display device, such as an LCD or other visual display device, which is integrated with a housing of the in-vehicle information system 104, or the display 144 is an external display device that is operatively connected to the in-vehicle information system 104 through a wired or wireless interface to receive output signals from the controller 108 to generate a display of the 3D virtual environment. In an embodiment where the in-vehicle information system 104 is an in-vehicle embedded computing device, the display 144 is an LCD or other flat panel display that is located in the console of a vehicle, or the display 144 is a head-up display (HUD) or other projection display that displays the 3D virtual environment on a windshield or other display surface in the vehicle.

In the in-vehicle information system 104, the vehicle sensors 170 include any device in the vehicle that generates digital data corresponding to the condition of the vehicle or the environment around the vehicle that the controller 108 uses to adjust a visual depiction of the static map features. Examples of sensors that are used in different vehicle configurations include, but are not limited to, cameras, light sensors, thermometers, hygrometers, motion sensors, speedometers, range finding sensors, and the like. In some embodiments, an in-vehicle clock is another sensor that records the time of day around the vehicle. In some embodiments, the positioning system 148 or network device 152 receive time data to set the clock and identify the position of the sun or moon in the sky at different times when the vehicle is in different geographic locations. In the example of FIG. 1, the positioning system 148 also acts as a sensor to indicate the location and optionally direction of travel and speed of the vehicle. In some vehicles, additional sensor data may be provided indirectly from subsystems that perform other functions in the vehicle. For example, many vehicles include traction control and anti-lock brake functionality that is activated during slippery road conditions. In one embodiment, the controller 108 identifies slippery road conditions with reference to data from the fraction control and anti-lock brake systems. A sensor control parameter 174 corresponds to the identified slippery condition data, and the controller 108 generates the visual depiction of the virtual environment with the corresponding rendering parameter 178 to produce a graphical effect corresponding to the slippery conditions in the 3D virtual environment.

Figure 2:
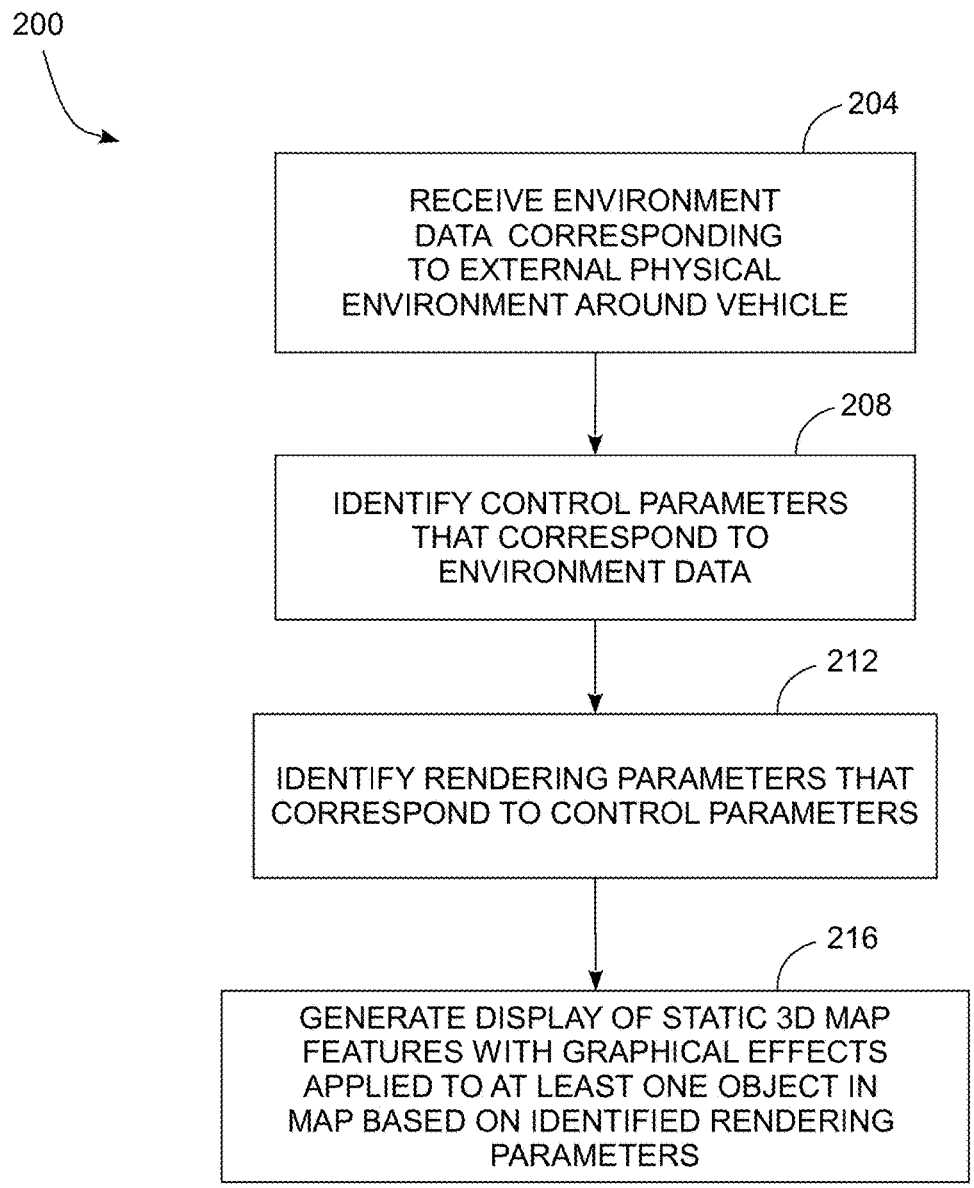
FIG. 2 is a block diagram of a process for generation of the transformed 3D virtual environment display with reference to environment data from environment data collection devices including vehicle sensors and network devices that received data from online information sources.

FIG. 2 depicts a process 200 for generation of a visual depiction of a virtual environment including map data corresponding to the physical environment that is external to the vehicle and one or more graphical effects in the virtual environment that indicate environmental conditions of the external physical environment. In the description below, a reference to the process 200 performing or doing some function or action refers to one or more controllers or processors that are configured with programmed instructions, which are executed by the controllers or processors to implement the process performing the function or action or operating one or more components to perform the function or action. The process 200 is described with reference to the in-vehicle information system 104 and associated components in FIG. 1 for illustrative purposes.

Process 200 begins as the in-vehicle information system 104 receives environment data, including sensor data and online data, which correspond to the physical environment external to the vehicle (block 204). The in-vehicle information system 104 receives data from the positioning system 148 to identify a geographic location of the vehicle and corresponding static map features 124 that correspond to the location of the vehicle. The controller 108 also retrieves data, such as weather and traffic data, from one or more of the online information services 190 for the geographic region around the vehicle. The controller 108 also receives sensor data from the vehicle sensors 170.

Process 200 continues as the in-vehicle information system 104 identifies control parameters that correspond to the online information and sensor data (block 208). In the embodiment of the in-vehicle information system 104, the controller 108 performs a table lookup or other suitable search using the online information and sensor data to identify control parameters 174 in the memory 120. The controller 108 typically identifies multiple control parameters that correspond to different data items. For example, the controller 108 identifies a control parameter corresponding to the identified temperature in a weather report for the region around the vehicle and another control parameter corresponding to the time of day, which affects the angle of the sun above the horizon.

Process 200 continues and the in-vehicle information system 104 identifies rendering parameters that correspond to the identified control parameters (block 212). As described above, the memory 120 stores predetermined associations between the control parameters 174 and corresponding rendering parameters 178. Additionally, the controller 108 assigns priority to some control parameters with reference to the source of the control parameter data in the event of conflicting indications from two different control parameters. For example, if a weather report indicates rain in a region around the vehicle, then a first control parameter 174 is associated with a rendering parameter 178 that includes rain effects in the display of the environment around the vehicle. If, however, an in-vehicle hygrometer indicates that the humidity level is too low for rain, then the controller 108 identifies a different control parameter 174 and associated rendering parameter 178 that depicts, for example, overcast weather but does not display precipitation. Various in-vehicle sensors including, but not limited to, cameras, light sensors, in-vehicle radar devices, thermometers, and the like generate data about the environment that surrounds the vehicle and the controller 108 can use the data from the in-vehicle sensors to identify local light and weather conditions to override more general environment data such as the data from a weather report.

Process 200 continues as the in-vehicle information system 104 generates a display of the static 3D map features with a graphical transformation of the map display using the identified rendering parameters (block 216). In the in-vehicle information system 104, the GPU 116 generates a 3D virtual environment including the static map features 124 and the GPU 116 applies, for example, textures, lighting effects, and shader programs to transform the static map features with the selected rendering parameters. Specific examples of graphical effects that depict rain in the 3D virtual environment include depictions of rain drops, mist, ground reflection, color changes to water-covered surfaces, and water puddles. The graphical effects can be generated using specific textures, lighting, particle effects, and other graphical effects that show rain. In one configuration, the GPU 116 introduces animated graphical effects that are displayed as a series of frames through the display device 144 in addition to the static map features. For example, the GPU 116 generates animated graphical effects depicting falling precipitation and windy conditions in the 3D virtual environment.

As described above, in the in-vehicle information system 104, the memory 120 stores predetermined control parameters 174 in association with predetermine rendering parameters 178 for use in generating graphical transformations of the static map feature data 124 to correspond to time and environmental conditions around the vehicle. In one embodiment, the control parameters 174 and corresponding rendering parameters 178 are generated through a manual process prior to manufacture of the in-vehicle information system 104. For example, a test vehicle operates under controlled test scenarios that correspond to common conditions under which similar vehicles are operated after production. The vehicle is operated under sunny, rainy, and snowy conditions during both daylight and night conditions in urban and rural physical environments. The vehicle sensors and data retrieved from online information sources during each of the test scenarios are stored in a memory, and human operators select appropriate graphical parameters and graphical transformation effects for each of the controlled scenarios.

In another embodiment, a machine learning process generates the association between the control parameters 174 and rendering parameters 178 in an automated or semi-automated manner. In the machine learning process, pairs of labelled parameter sets with associations between training data control parameters and predetermined graphics effect parameters are provided as inputs to different machine learning algorithms, including both parametric or non-parametric machine learning processes. The machine learning processes use the predetermined training parameter pairs to generate additional associations between larger sets of control parameter data and graphical parameters automatically. In an embodiment where video or camera sensors in the vehicle are used to identify control parameters, the training and testing data are produced with a generate-and-test method. In the generate-and-test method, a training computer system applies combinations of different rendering parameters to generate a wide range of graphical outputs, and an image-processing program compares the graphical outputs of different graphical effects to the image data recorded by the cameras in the vehicle. The training computer system identifies the graphical parameters that correspond to graphical effects in the generated graphics with the greatest similarity to the image data generated by the in-vehicle cameras. Thus, for each set of input control parameters, the set of corresponding rendering parameters will be the one that produces the synthetic image with the greatest similarity to the camera images.

Figure 3A:
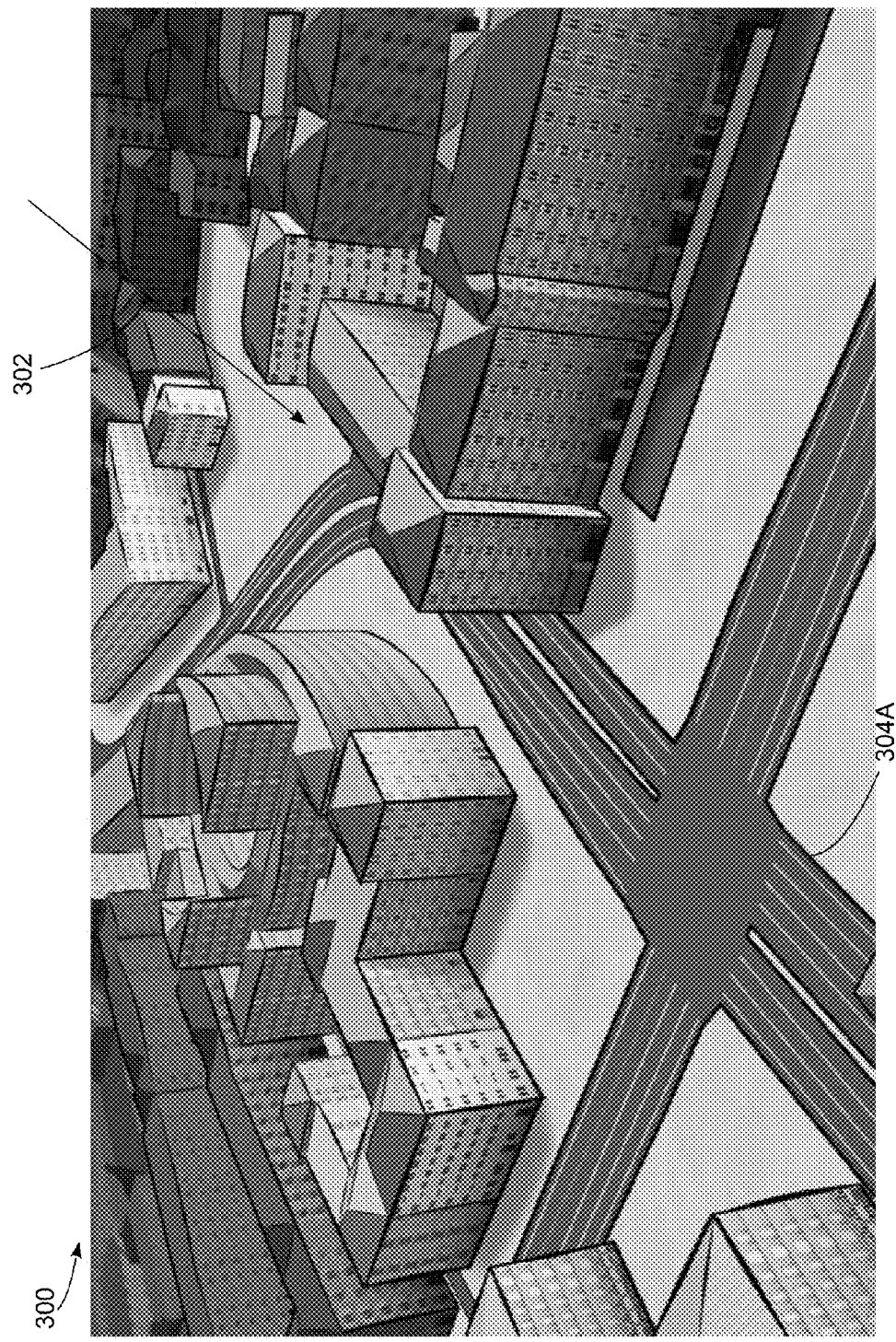
FIG. 3A is a first depiction of map features in a 3D virtual environment during daytime conditions with sunny weather.

FIG. 3A-FIG. 3E are examples of visual depictions of a virtual environment that are generated using the system 104 of FIG. 1. In FIG. 3A, the scene 300 includes static map features including structures and roads that are depicted during daylight under sunny weather conditions. Each of the visual depictions of FIG. 3A-FIG. 3E includes one or more graphical effects that are applied to different objects in the virtual environment to depict the same static map data in visually distinct manners to depict the environmental conditions external to the vehicle. The controller 108 receives environment data, uses the control parameters to identify rendering parameters based on the environment data, and then applies the graphical effects corresponding to the rendering parameters to generate the visual output of the virtual environment. In the scene 300, the in-vehicle information system 104 places a light source corresponding to the sun above the depicted map features and shining down as indicated by arrow 302. The structures cast shadows and portions of the roofs of the structures either receive direct light are shown in shadow to correspond to the rays of sunlight in the physical environment around the vehicle. The scene 300 includes an outline 304A that is formed around a road to highlight the road in the scene.

Figure 3B:
FIG. 3B is another depiction of the 3D virtual environment of FIG. 3A during twilight.

FIG. 3B depicts a scene 310 including the same static map features that are depicted in FIG. 3A. The scene 310 is generated at twilight, with sunlight illuminating the scene 310 at a steep angle indicated by the arrow 312. The scene 310 includes a highlight line 304B around a road to increase the visibility of the road in the scene. The highlight line 304B optionally corresponds to streetlights that are located along the road, or one of the rendering parameters 178 instructs the GPU 116 to apply an outline graphical effect or other highlight effect to increase the visibility of the road under reduced light conditions.

Figure 3C:
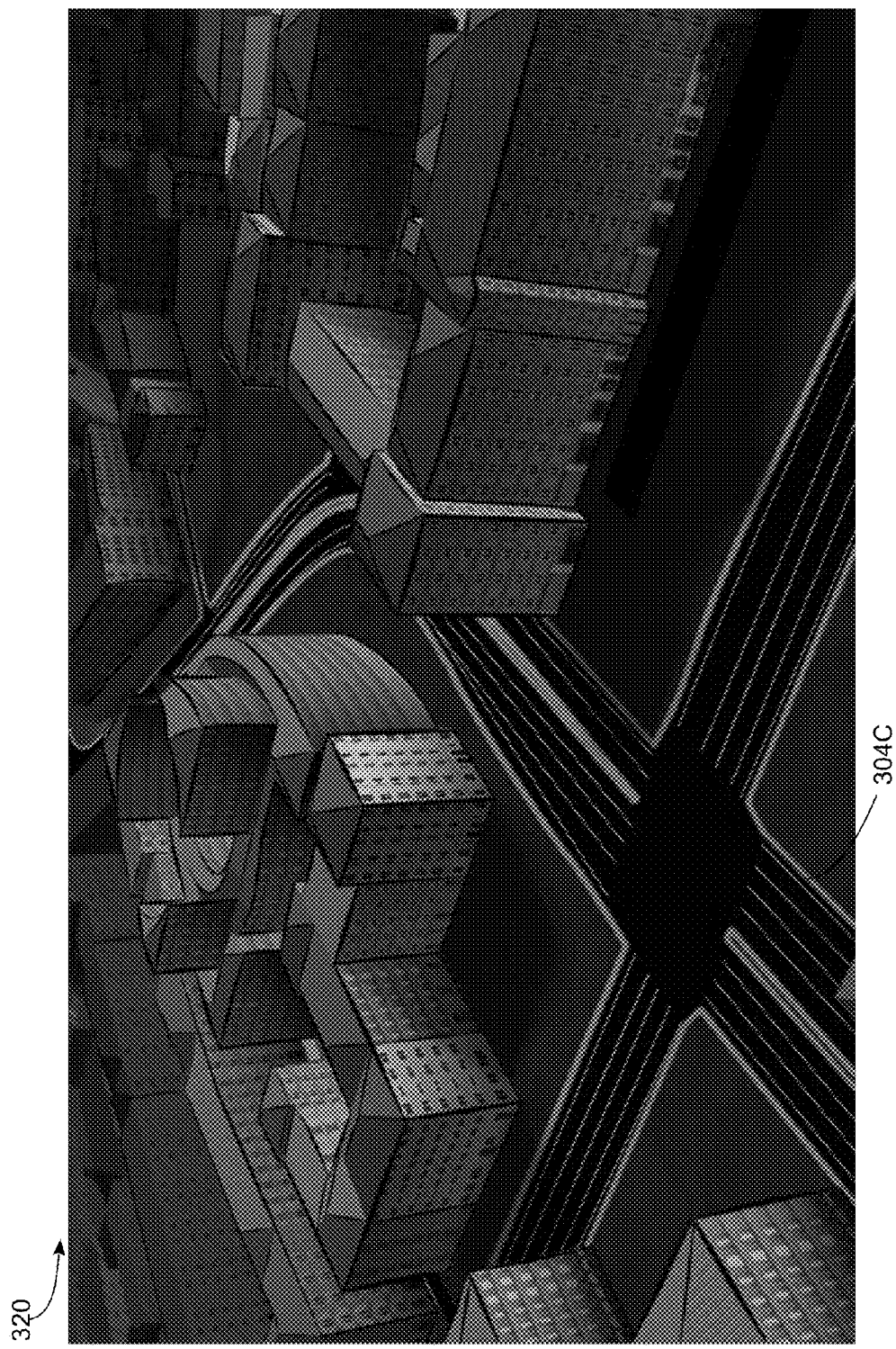
FIG. 3C is another depiction of the 3D virtual environment of FIG. 3A during nighttime.

FIG. 3C depicts a scene 320 including the same static map features that are depicted in FIG. 3A-FIG. 3B. The scene 320 is generated at night, with moonlight illuminating the scene 320. The scene 320 also includes a highlight line 304C that is drawn around the road to increase the visibility of the road in the depiction of the virtual environment. The highlighted road may not correspond to the actual appearance of the road in the physical environment around the vehicle, but the highlight 304C provides an intuitive visual indicator of the road to the vehicle operator.

Figure 3D:
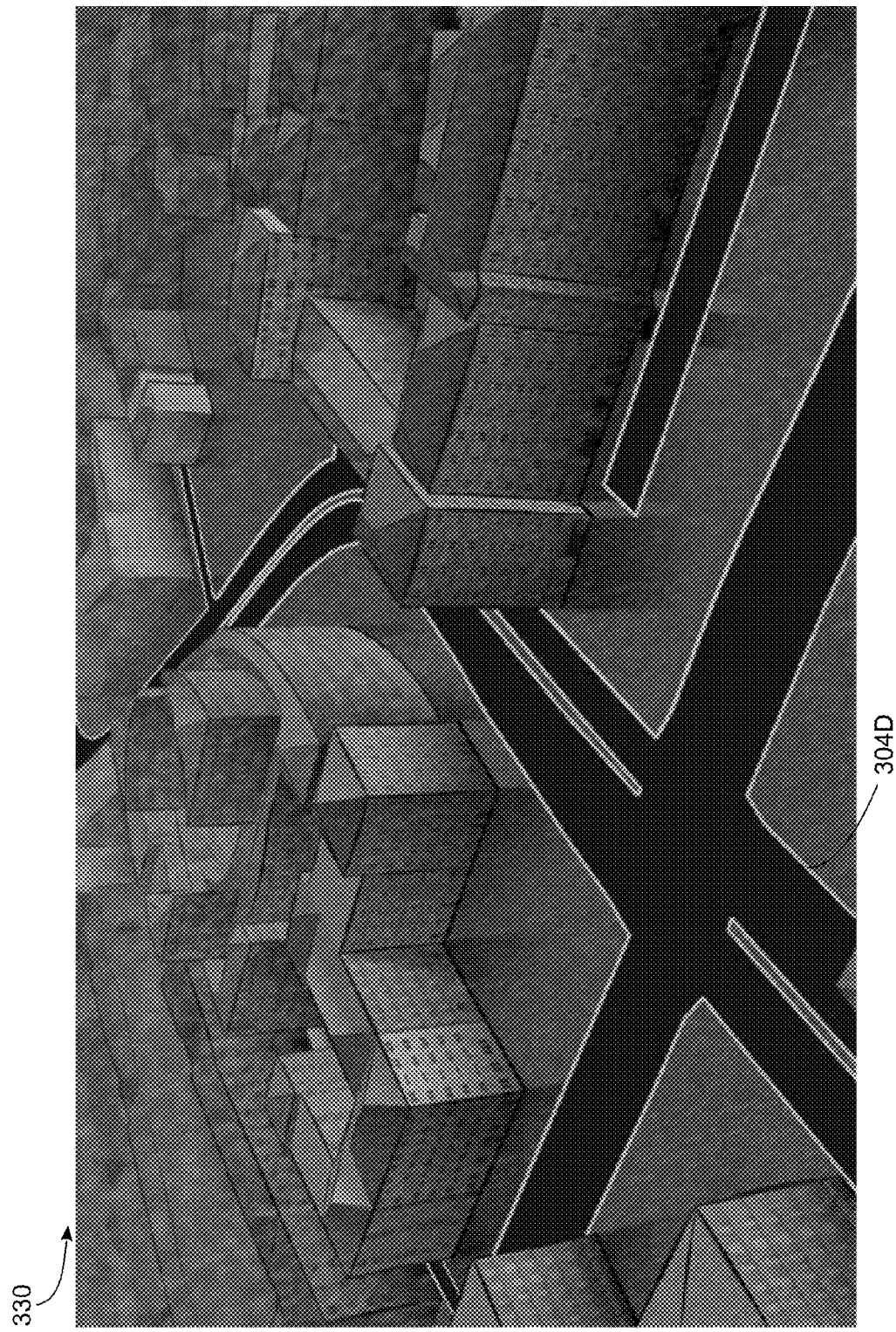
FIG. 3D is another depiction of the 3D virtual environment of FIG. 3A during rainy weather conditions.

FIG. 3D depicts a scene 330 including the same static map features that are depicted in FIG. 3A-FIG. 3C during a rainstorm. In FIG. 3D, the GPU 116 uses one or more of the weather and seasonal effects 136 that are indicated by a rendering parameter 178 to generate an overlay graphic depicting rain and fog. The static map features such as the buildings are displayed behind the rain. The road includes a highlight 304D, which has a different color than the highlights 304B and 304C, to provide a clear indication of the road through the rain and cloud graphical effects.

FIG. 3E similarly depicts a scene 340 with snow. In FIG. 3E, the GPU 116 generates a graphical effect depicting falling snowflakes. Control parameters 174 that indicate snow also correspond to additional rendering parameters 178 that are used to transform the display of the static map features using the corresponding weather and seasonal effects 136 that are specified by the rendering parameters 178. For example, in FIG. 3E the GPU 116 generates a display of an artistic snow accumulation effect 342 over the default view of the ground in the virtual environment. Specific examples of graphical effects that depict snow in the 3D virtual environment include depictions of snow flakes, light reflection from snow-covered surfaces, and piles of accumulated snow. The graphical effects can be generated using specific textures, lighting, particle effects, and other graphical effects that show the snow. The GPU 116 also adjusts the color of rooftops for buildings in the scene 340 to depict snow accumulation on the roofs of the buildings.

While FIG. 3A-FIG. 3E depict stylized 3D virtual environments, another embodiment generates photorealistic images of the static map features. In a photorealistic embodiment, the in-vehicle information system 104 applies methods for photorealistic rendering effects such as global illumination, realistic soft shadow rendering, ambient occlusions, environment lighting, many lights simulation, to depict the effects of time-varying lighting/shading (e.g., day/night lighting simulation) and weather effects (e.g., effects of raining, snowing, etc.). In another embodiment, the display includes a combination photorealistic and stylized map features. For example, for 3D map elements with a low priority for use in a navigation or mapping application are depicted with photorealistic graphics. High priority map features, such as roads along a navigation route, landmarks, and the navigation destination, are depicted with stylized graphics that are easily distinguishable from the photorealistic graphics for the low priority map features. Thus, the high priority map features are easily visible to the vehicle operator while the map display continues to display photorealistic map features.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. An in-vehicle information system within a vehicle comprising:
    a memory in the vehicle configured to store:
        map data corresponding to a plurality of objects in a virtual environment corresponding to a physical environment external to a vehicle;
        rendering parameter data including a plurality of rendering parameters corresponding to graphical effects to modify a visual representation of the plurality of objects in the map data; and
        control parameter data including a plurality of control parameters, each control parameter including an association between a predetermined environmental condition in the physical environment external to the vehicle and at least one rendering parameter in the plurality of rendering parameters;
    a network device in the vehicle configured to receive first environment data corresponding to at least one environmental condition in the physical environment external to the vehicle from an online information source that is external to the vehicle;
    a vehicle sensor in the vehicle configured to generate second environment data corresponding to the at least one environmental condition in the physical environment external to the vehicle;
    a display device in the vehicle configured to generate a graphical depiction of the plurality of objects in the virtual environment; and
    a controller in the vehicle operatively connected to the memory, the network device, the vehicle sensor, and the display device, the controller being configured to:
        receive the first environment data corresponding to the physical environment external to the vehicle with the network device from the online information source;
        receive the second environment data corresponding to the physical environment external to the vehicle from the vehicle sensor;
        identify a first rendering parameter in the plurality of rendering parameters with reference to the plurality of control parameters and the first environment data;
        identify a second rendering parameter in the plurality of rendering parameters with reference to the plurality of control parameters and the first environment data;
        identify a third rendering parameter in the plurality of rendering parameters with reference to the plurality of control parameters and the second environment data;
        generate a first visual depiction of the virtual environment using the display device in response to the second environment data from the vehicle sensor corresponding to the first environment data from the online information source, the first visual depiction including at least one object in the map data, a first graphical effect corresponding to the first rendering parameter being applied to the at least one object in the virtual environment, and a second graphical effect corresponding to the second rendering parameter being applied to the at least one object in the virtual environment; and
        generate a second visual depiction of the virtual environment using the display device in response to the second environment data from the vehicle sensor being different than the first environment data from the online information source, the second visual depiction including the at least one object in the map data, the first graphical effect corresponding to the first rendering parameter being applied to the at least one object in the virtual environment, and a third graphical effect corresponding to the third rendering parameter being applied to the at least one object in the virtual environment instead of the second graphical effect to override the second graphical effect based on the second environment data from the vehicle sensor being different than the first environment data from the online information source.

2. The in-vehicle information system of claim 1, the controller being further configured to:
    identify the third rendering parameter in the plurality of rendering parameters corresponding to at least one weather condition in the physical environment that is external to the vehicle with reference to the plurality of control parameters and the second environment data; and applying the third graphical effect corresponding to the third rendering parameter to the at least one object to depict the at least one weather condition in the virtual environment with the display device in addition to the first graphical effect.

3. The in-vehicle information system of claim 2, the controller being further configured to:
- identify that the at least one weather condition corresponds to rain; and
- apply the third graphical effect corresponding to the rain to the at least one object in the virtual environment in response to the at least one weather condition in the weather condition data corresponding to rain.

4. The in-vehicle information system of claim 2, the controller being further configured to:
- identify that the at least one weather condition corresponds to snow; and
- apply the third graphical effect corresponding to accumulated snow on a surface of the at least one object in the virtual environment in response to the at least one weather condition in the weather condition data corresponding to snow.

5. The in-vehicle information system of claim 1, the data stored in the memory further comprising:
- a first texture;
- a second texture; and
- the controller being further configured to:
  - receive the first environment data including first weather condition data from the online information source indicating sunny weather in the physical environment external to the vehicle;
  - receive the second environment data including second weather condition data indicating shadow around the vehicle from the vehicle sensor;
  - identify the second rendering parameter in the plurality of rendering parameters corresponding to the first texture with reference to the plurality of control parameters and the first weather condition data;
  - identify the third rendering parameter in the plurality of rendering parameters corresponding to the second texture with reference to the plurality of control parameters and the second weather condition data; and
  - generate the second visual depiction of the virtual environment with only the second texture being applied to the surface of the at least one object in the virtual environment.

6. The in-vehicle information system of claim 1, the data stored in the memory further comprising:
- a first shader program configured to generate a first graphical effect for an object in the virtual environment;
- a second shader program configured to generate a second graphical effect for the object in the virtual environment; and
- the controller being further configured to:
  - receive the first environment data including first weather condition data from the online information source for the physical environment external to the vehicle;
  - receive the second environment data including second weather condition data from the vehicle sensor for the physical environment external to the vehicle;
  - identify the second rendering parameter in the plurality of rendering parameters corresponding to the first shader program with reference to the plurality of control parameters and the first weather condition data;
  - identify the third rendering parameter in the plurality of rendering parameters corresponding to the second shader program with reference to the plurality of control parameters and the second weather condition data; and
  - generate the second visual depiction of the virtual environment with execution of only the second shader program to generate the third graphical effect applied to the at least one object in the virtual environment.

7. A method of generating a display of a virtual environment corresponding to a physical environment external to a vehicle comprising:
- receiving with a network device in the vehicle first environment data corresponding to at least one environmental condition in the physical environment external to the vehicle from an online information source that is external to the vehicle;
- generating with a vehicle sensor in the vehicle second environment data corresponding to at least one environmental condition in the physical environment external to the vehicle;
- receiving with a controller in the vehicle the first environment data from the online information source and the second environment data from the vehicle sensor corresponding to the physical environment external to the vehicle;
- identifying with the controller a first rendering parameter in a plurality of rendering parameters stored in a memory with reference to a plurality of control parameters stored in the memory and the first environment data;
- identifying, with the controller a second rendering parameter in the plurality of rendering parameters with reference to the plurality of control parameters stored in the memory and the first environment data;
- identifying with the controller a third rendering parameter in a plurality of rendering parameters stored in the memory with reference to the plurality of control parameters stored in the memory and the second environment data;
- generating with the controller and a display device in the vehicle a first visual depiction of the virtual environment in response to the second environment data from the vehicle sensor corresponding to the first environment data from the online information source, the first visual depiction including at least one object in map data stored in the memory, a first graphical effect corresponding to the first rendering parameter being applied to the at least one object in the virtual environment, and a second graphical effect corresponding to the second rendering parameter being applied to the at least one object in the virtual environment; and
- generating with the controller and the display device a second visual depiction of the virtual environment in response to the second environment data from the vehicle sensor being different than the first environment data from the online information source, the second visual depiction including the at least one object in the map data, the first graphical effect corresponding to the first rendering parameter being applied to the at least one object in the virtual environment, and a third graphical effect corresponding to the third rendering parameter being applied to the at least one object in the virtual environment instead of the second graphical effect to override the second graphical effect based on the second environment data from the vehicle sensor being different than the first environment data from the online information source.

8. The method of claim 7 further comprising:
identifying with the controller the third rendering parameter in the plurality of rendering parameters corresponding to at least one weather condition in the physical environment that is external to the vehicle with reference to the plurality of control parameters and the second environment data; and
applying with the controller the third graphical effect corresponding to the third rendering parameter to the at least one object to depict the at least one weather condition in the virtual environment with the display device in addition to the first graphical effect.

9. The method of claim 8, the application of the graphical effect further comprising:
identifying with the controller that the at least one weather condition corresponds to rain; and
applying with the controller the third graphical effect corresponding to rain to the at least one object in the virtual environment in response to the at least one weather condition in the weather condition data corresponding to rain.

10. The method of claim 8, the application of the graphical effect further comprising:
identifying with the controller that the at least one weather condition corresponds to snow; and
applying with the controller the third graphical effect corresponding to accumulated snow on a surface of the at least one object in the virtual environment in response to the at least one weather condition in the weather condition data corresponding to snow.

11. The method of claim 7 further comprising:
receiving with the controller the first environment data including first weather condition data from the online information source indicating sunny weather in the physical environment external to the vehicle;
receiving with the controller the second environment data including second weather condition data from the vehicle sensor indicating shadow around the vehicle in the physical environment external to the vehicle;
identifying with the controller the second rendering parameter in the plurality of rendering parameters corresponding to a first texture stored in the memory with reference to the plurality of control parameters and the first weather condition data;
identifying with the controller the third rendering parameter in the plurality of rendering parameters corresponding to a second texture stored in the memory with reference to the plurality of control parameters and the second weather condition data; and
generating with the controller and the display device the second visual depiction of the virtual environment with only the second texture being applied to the surface of the at least one object in the virtual environment.

12. The method of claim 7 further comprising:
receiving with the controller the first environment data from the online information source as first weather condition data in the physical environment external to the vehicle;
receiving with the controller the second environment data from the vehicle sensor as second weather condition data in the physical environment external to the vehicle;
identifying with the controller the second rendering parameter in the plurality of rendering parameters corresponding to a first shader program stored in the memory with reference to the plurality of control parameters and the first weather condition data;
identifying with the controller the third rendering parameter in the plurality of rendering parameters corresponding to a second shader program stored in the memory with reference to the plurality of control parameters and the second weather condition data; and
generating with the controller and the visual display device the second visual depiction of the virtual environment with execution of only the second shader program to generate the third graphical effect applied to the at least one object in the virtual environment.

* * * * *